3,391,103
PHENOLIC RESIN PLASTIC COMPOSITIONS
CONTAINING CARBONACEOUS FILLER
Albert J. Mueller, Johnson City, Tenn., assignor to Great
Lakes Carbon Corporation, New York, N.Y., a corporation of Delaware
No Drawing. Filed Aug. 27, 1965, Ser. No. 483,335
12 Claims. (Cl. 260—38)

ABSTRACT OF THE DISCLOSURE

Plastic compositions based upon phenolic resins are made using as a filler finely divided oxidized carbonaceous particles of petroleum origin. The oxidized particles are typically made by the oxidation of particles of raw or partially calcined petroleum coke from a delayed coker or of particles of fluid petroleum coke.

Molded products, having reduced flow marks and enhanced heat resistance, gloss retention and impact strength, are made from the plastic compositions.

BACKGROUND OF THE INVENTION

Field of the invention

This invention relates to plastic compositions and more particularly to plastic compositions based upon phenolic resins which contain a particular type of finely divided carbon as a filler.

DESCRIPTION OF THE PRIOR ART

A large number of fillers are currently used in plastics of the phenolic resin type and for a variety of reasons, usually for cost reduction but also for quality improvement, e.g., cotton fibers for toughness, carbon black for color, asbestos for moisture and heat resistance, etc., wood charcoal for heat resistance, moisture resistance and impact strength, etc.

SUMMARY OF THE INVENTION

It is an object of the present invention to find suitable replacements for wood charcoal as a filler in phenolic resin plastic compositions, and replacements, moreover, which impart greater "uniformity" and "less abrasiveness" and, typically also, higher heat resistance to molded products prepared from said resins than does charcoal. (The meaning and importance of "uniformity" and "less abrasiveness" or improved abrasion resistance, and of "heat resistance" are described in more detail hereinafter.) It is an additional object of this invention to accomplish the foregoing principal objectives without the introduction of concomitant process disadvantages and without adversely affecting other properties required for the molded phenolic resin-filler product, but rather to improve the processing and product properties.

DETAILED DESCRIPTION OF THE INVENTION

These objects as well as others which will be apparent from the detailed description which follows are accomplished by mixing particular types of finely divided carbon described in detail hereinafter, with a phenolic resin and typically also with a heat-hardening catalyst, an "activator" and a lubricant or mold-release agent such as stearic acid, and optionally also with additional materials such as mineral asbestos, cotton floc or fibers, carbon black and/or dyes, etc.

The phenolic resins and plastics referred to herein are derived from the condensation of phenols (such as hydroxy benzenes, cresols, xylenols, resorcinols, etc.) and aldehydes (formaldehyde, furfural, etc.). Although many different combinations of phenols and aldehydes are possible for resin formation, the basic chemicals phenol and formaldehyde are overwhelmingly employed to the exclusion of most other possible combinations for the manufacture of "phenolic resins" and it is this type of "phenolic resin" which is typically and preferably employed in the present invention although the invention is applicable to the other types of phenolic resins as well.

In the manufacturing process, the phenol-formaldehyde (or other type of phenol and/or aldehyde) resin may pass through three stages: A-stage or "resol" stage; B-stage or "resitol" stage; and C-stage, or "resite" stage, which is actually the final cure of a phenolic part in a mold. This third stage is eliminated in the so-called "two-step" process, wherein the phenol and formaldehyde are placed in a reaction kettle with a catalyst such as sulfuric acid and heated 3 or 4 hours at 285° to 325° F., the ratio of formaldehyde to phenol being less than 1:1 (i.e. excess of phenol). The first step in this process is the condensation reaction, in which water is eliminated and a thermoplastic resin, called a "novolak," is formed which is generally considered to be noncuring. This viscous resin is collected in shallow trays and allowed to harden.

The second part of the "two-step" process consists of crushing and grinding this novolak resin and blending it with an "activator," which provides a source of additional methylene "bridges" to convert the novolak into the final form of phenolic resin that is capable of being cured. This activator generally is "hexamethylenetetramine" which the industry has shortened to "hexa."

Phenolic resins can be modified by the addition of plasticizers, pigments, lubricants, fillers and other ingredients during the A-stage or before the condensation reaction is complete in the "two-step" process. They may exist in either solid or liquid form, although it is more convenient to store them in granular or macerated form. The claimed plastic-carbonaceous filler compositions of this invention are intended, therefore, to include any of the aforedescribed chemical or physical variations of "phenolic resins."

It is a finding of this invention that oxidized carbonaceous particles or fines, hereinafter described and characterized, are an advantageous replacement for charcoal in this usage as a filler in phenolic resins and that, in many respects, said oxidized carbonaceous materials are superior to charcoal as a filler in phenolic resins.

In a preferred embodiment this invention comprises: mixing oxidized carbonaceous particles or fines with a phenolic resin and a lubricant, and also with other materials such as previously indicated, such as at room temperature(s) in a paddle mixer; processing and heating (heat-working) the resulting premix in a heated blending device or mixer (heated differential rollers can be used) to between about 130° F. and about 300° F.; stripping the material from the blending device; grinding the blended material; forming or shaping this ground or shredded material into suitable preforms (such as by compressing them into disk shapes about 3 inches in diameter and 1½ inch thick); heating the preforms in a dielectric furnace (such as in a high frequency diathermic unit known as "Thermall" and produced by W.T. La Rose Co., Troy, N.Y.) to a desired molding temperature such as between about 220 and about 350° F.; and molding and curing the preforms, such as in a compression mold, to the desired shape.

In order to compare the effectiveness of the oxidized carbonaceous particles used in the process and compositions of the present invention with charcoal, a plant test was carried out. The sequence of operations for the production of molded products was as follows:

(A) Mix ingredients -- Dry powders in a paddle mixer.
(B) Heat-work -------- Process and heat the premix in a heated blending device (C) Strip _____ Separate the "heat-worked" material from blending device after it is substantially uniform and homogenous.

(D) Grind blended material _____ Cold or hot (as long as the chunks stripped from the blending device or rollers are sufficiently cool so as to be rigid).

(E) Preform _____ Compress into disk forms about 3" diameter by 1½" thick.

(F) Heat "preforms" __ In a dielectric furnace to desired temperature such as 220–350° F.

(G) Mold heated "preforms" _____ To desired shape, such as in 600-ton transfer press and hold for sufficient time to cure, e.g. 1–3 minutes.

(H) Degate _____ To remove the "gate" left on the end of the piece from the transfer runner of the mold.

The formulation of the mix as used in the plant test was as follows.

Ingredient: Parts by wt.
Phenolic resin[1] (containing 10 to 15% "hexa" activator) _____ 1000
Mineral asbestos _____ 450
Lubricant (stearic acid) _____ 40
Carbon filler _____ 400
Floc (cotton) _____ 100
Nigrosine base (black dye) _____ 20

[1] A "novolak" resin was first made, using an acid catalyst, after which the resin was blended with the "hexa."

The oxidized carbonaceous particles used in the plant test (and which are generally representative of the oxidized carbonaceous particles of the present invention) possessed the properties set forth in column A of Table I. (More details referring to material A and how it was made, etc., are set forth hereinafter.) Columns B and C set forth properties of two separately tested charcoals and are considered generally representative of charcoal.

TABLE I

|  | A | B | C |
|---|---|---|---|
| Moisture, Percent | 0.9 | 3.9 | 4.7 |
| Ash, Percent | 0.5 | [1] 9.7 | 6.1 |
| Bulk Density, lbs./cu. ft. | 42 | 19.2 | 21.8 |
| Particle Size (Dry Screen Analysis): |  |  |  |
| +150 Percent | 17.9 | 19.5 | 58 |
| −150 Percent | 82.1 | 80.5 | 42 |
| −200 Percent | 51.1 | 59.5 | 28 |
| −325 Percent | 8.5 | 30.0 | 14 |

[1] Approximate.

The carbonaceous material (A) of the present invention handled well in the mixing, rolling, and grinding operations. The disk shaped preforms, containing 210 grams each, were more compact than obtained with charcoal by about ⅛ inch overall. This compaction is considered an advantage as it allows more convenient packing in the transfer mold press. The preform heating step was carried out in a two-sequence batch operation using five preforms in each batch. Each batch received 2½ minutes dielectric heating. The preforms containing the oxidized carbonaceous particles (A) were found to give a slightly better heating rate than charcoal (higher KVA) and this was considered an advantage. The molding and degating operations were essentially equivalent to using charcoal. By the end of the plant test it was found that there was no loss in production time compared to charcoal. The operation with the smaller preforms was also preferred by the mold operator.

The finished molded products were subjected to laboratory tests and those made with the oxidized carbonaceous particles (A) of the present invention were found superior to those made with charcoal with respect to flow marks, heat resistance, and gloss retention after heat. The products of the present invention were also more "uniform," i.e., they possessed little or no evidence of unincorporated or segregated ash components or other contaminants. The products made with charcoal were not as "uniform" in this respect. The products of the present invention also appeared to be superior to those made with charcoal in impact strength by a qualitative comparison (Baldwin impact tester) and in "mold-erosion" tests, i.e., they were less abrasive than those made with charcoal in the molding step. The mold-erosion test was run by drilling a given number of holes in the preform under a given pressure and a given drill speed to a given depth with a sharp drill. The time required to drill the holes constitutes the test result, the lower the time the better. This test is very important as mold erosion is a significant cost item, and charcoal often causes significant problems due to the fact that sand and dirt is frequently found in the ground charcoal material. (The combined mineral and ash content of the oxidized carbonaceous particles of the present invention is typically less than 1% and as a maximum is no higher than 2%, whereas the combined mineral and ash content of charcoal is generally much higher than 2%.)

Table II is set forth as an indication of results actually obtained in several of the foregoing described laboratory tests, all tests having been run according to ASTM Standards on Plastics D–20:

TABLE II

| Test | Charcoal | Oxidized Carbonaceous Particles (A) |
|---|---|---|
| Impact Strength, Notched (ft.-lb./in.) | 0.239 | 0.246 |
| Flexural Strength, p.s.i. | 7,240 | 7,330 |
| Dielectric Strength, Volts per mil | 380 | 387 |
| Heat Resistance on Molded Product: |  |  |
| 475° F., 1 hour | [1] | [2] |
| 490° F., 1 hour | [3] | [4] |

[1] Gloss good.
[2] Gloss slightly better.
[3] Cracks develop.
[4] No cracks.

The foregoing discussion and data may be summarized as follows:

(a) Less mold erosion obtained during the molding step, probably as a result of less ash and mineral contamination in the oxidized carbonaceous particles;

(b) Greater product uniformity obtained due to the purity of the oxidized filler material;

(c) Superior heat resistance imparted to molded phenolic resin products prepared with the fillers of the present invention;

(d) In equivalent mesh sizes, the oxidized carbonaceous particles of the present invention typically possess approximately twice the bulk density of wood charcoal. This permits a reduction in the size of equipment used for handling the phenolic resin-filler mixtures, and produces more compact and convenient preforms for molding;

(e) Superior impact and flexural strength imparted to the molded phenolic plastic products by the oxidized carbonaceous particles;

(f) Higher dielectric resistance imparted to the phenolic resin-filler preforms by the oxidized carbonaceous particles which permits a less sensitive dielectric or diathermic heating step, which operation or step is typically carried out in the overall process of making molded phenol-resin products; and (g) Resultant molded phenolic plastic product is superior in surface gloss when oxidized carbonaceous particles used, both before and after heat test such as referred to above, e.g., heating the molded product to 490° F. and keeping it at that temperature for one hour.

Other distinctions or advantages noted were:

(1) Less undesirable flow marks obtained from the transfer mold, or discernible in the molded product made using the oxidized carbonaceous particles;

(2) Great resistance to moisture in the molded plastic product made with the oxidized carbonaceous particles; and (3) Absence of danger of spontaneous combustion in storage compared to charcoal.

The oxidized carbonaceous particles which are employed in the present invention are produced by processing selected carbonaceous particles of petroleum origin at elevated temperatures in an oxidizing gas such as air. Suitable carbonaceous particles of petroleum origin which may be oxidized and then employed as a filler for phenolic resins in the present invention include the following materials:

(A) Delayed coker raw petroleum coke having a hydrocarbon volatile matter content of between about 8% and about 17%;

(B) Coke A which has been "partially" calcined; e.g. some of its initial volatile matter content, typically at least 30% of it, has been removed, but the removal is incomplete and the partially calcined material still possesses at least 3% hydrocarbon volatile matter content;

(C) Fluid coker petroleum coke having a hydrocarbon volatile matter content between about 3% and about 10%.

The suitable carbonaceous particles which may be oxidized and then employed in the present invention may be generically categorized as being of petroleum origin and as having an initial hydrocarbon volatile matter content exceeding 3%. They also generally have a bulk density in excess of 30 lbs. per cubic foot, and more typically in excess of 40 lbs. per cubic foot under typical sizing conditions. (It is conceivable that they could be ground so fine or micropulverized so fine that their bulk density (and the bulk density of the oxidized carbonaceous particles produced from same) could be less than 30 lbs./cu. ft. but this would not be typical.)

These selected carbonaceous particles of petroleum origin are then processed in an oxidizing gas in such a manner that their initial hydrocarbon volatile matter content is reduced and their initial oxygen content (if any) is increased.

For example, when material A, i.e. delayed coker raw petroleum coke is employed as the starting material, upon oxidation its hydrocarbon volatile matter content is typically reduced about 20% from its original value (e.g. from 17% to about 13–14% or from 8% to about 6%) and its oxygen content is typically raised from less than 1% by weight of the starting material to at least 5% by weight of the oxidized product. In the case of materials B and C, they, upon oxidation, will also evolve or lose some of their initial hydrocarbon volatile matter content, although not as much as material A, and they also will have their oxygen content increased, typically from less than 1% by weight of the starting material to at least 5% by weight of the oxidized product. It should be mentioned at this point that material B, when it is "fresh" and when it has just been partially calcined, typically will have an oxygen content of less than 1% and a hydrocarbon volatile matter content of, for example, about 4–6%, but that if it is permitted to stand in piles or "age" in the open air for a length of time it will undergo "autooxidation," i.e., it will pick up oxygen so that then its initial oxygen content will frequently be greater than 1%. The processing oxidizing step referred to herein, then, connotes an increase in oxygen content of either "fresh" or "aged" partially calcined raw petroleum coke (material B).

The technique(s) and processing conditions employed to oxidize the selected starting carbonaceous material are not critical to the present invention. They may be "batch" oxidized while in a stationary condition or they may be oxidized in a rotary kiln or in a fluidized bed, etc. The particle sizing of the carbonaceous particles to be oxidized may also be varied widely, as can be also the temperatures, times and quantities of oxidizing gas (such as air) which are used to produce the oxidized product.

The following table, therefore, is meant merely to illustrate some of the conditions which can be employed to produce oxidized carbonaceous particles used in the present invention, it being understood that other unspecified techniques or conditions can also be used and may sometimes result in higher yields, or faster processing rates, etc.

In all of the examples, except Example 4, the starting material is heated sufficiently high that at least a small fraction of its initial hydrocarbon volatile matter content is evolved. Example 4 is merely a continuation of Example 3 (wherein during which some hydrocarbon was evolved) and is set forth to show an extended processing time and slightly altered temperature conditions and some of the effects thereof on the characteristics of the resultant product.

TABLE III

| Ex. | Starting Material | Initial Bulk Density (lbs./cu. ft.) | Initial Particle Sizing, mesh/percent | Bed Depth x Diam. | Initial Hydrocarbon Volatile Matter Content, Percent | Initial O$_2$ Content, Percent | Final O$_2$ Content, Percent | Temp., °C. | Processing Time, Hrs. | S.c.f.m.* | Bulk Density of Product | Particle Sizing of Product, mesh/percent |
|---|---|---|---|---|---|---|---|---|---|---|---|---|
| 1 | A | 45 | +100/13<br>−100+200/25<br>−200/62 | 22″ x 6″ | 11.7 | <1 | 10 | 260–370 | 12–14 | 0.7 | 42 | After grinding<br>+100/ 5<br>−100+200/44<br>−200/51 |
| 2 | B | 48 | +100/15<br>−100+200/22<br>−200/63 | 15″ x 6″ | 5.2 | <1 | >10 | 310–345 | 19 | 0.7 | 45 | Not ground<br>+100/30<br>−100+200/29<br>−200/41 |
| 3 | C | 52 | +100/62<br>−100+200/33<br>−200/ 5 | 20″ x 6″ | 6.6 | <1 | 7 | 310–320 | 14 | 0.7 | 52 | After grinding<br>+100/26<br>−100+200/37<br>−200/37 |
| 4 | C | 52 | +100/62<br>−100+200/33<br>−200/ 5 | 20″ x 6″ | 6.6 | <1 | 7 | 310–320 | 14 | 0.7 | 52 | then |
|  |  |  |  |  |  |  | >10 | 310–500 | 33 | 0.7 | 50 | After grinding<br>+100/14<br>−100+200/18<br>−200/68 |
| 5 | A | 40 | +100/16<br>−100+200/21<br>−200/63 | 4′ to 6′ x 1′ | 11.7 | <1 | >14 | 260–370 | 24–26 | 10 | 38 | Not ground<br>+100/16<br>−100+200/29<br>−200/55 |

*S.c.f.m. refers to the number of cu. ft. of gas (air), calculated at 60° F., that is passed through the bed of material per minute.

The particle sizing of the oxidized carbonaceous material employed in the present invention should be such that it may be readily and uniformly blended into or incorporated into the phenolic resin. This means that as a general minimum requirement it should be substantially 100% minus 10 mesh (reference is to Tyler screen series) and at least 60% minus 100 mesh. More typical or representative of the particle sizing of the oxidized carbonaceous particles employed in the present invention is the following dry screen analysis:

Percent

| | | |
|---|---|---|
| +35 | 0.1 | |
| −35+48 | 0.2 | |
| −48+60 | 3.6 | 22.2% plus 100 mesh |
| −60+80 | 10.0 | |
| −80+100 | 8.3 | |
| −100+150 | 13.8 | 77.8% minus 100 mesh |
| −150 | 64.0 | |

The desired particle sizing may be obtained in several ways. For example, as is apparent from Table III, the starting carbonaceous material may be finely ground before it is oxidized, or the carbonaceous material may be oxidized in a relatively coarse condition and then the oxidized product finely ground, etc.

As previously indicated, the performance comparison with charcoal was made with an oxidized product of starting material A. This generally is the preferred oxidized carbonaceous material used in making the phenolic resin-filler compositions of the present invention. However, all of the oxidized carbonaceous materials described herein may also be used as fillers in the making of phenolic resin products. This is not to say that there are no differences in the production of or in the use of the oxidized carbonaceous materials employed in the present invention. For example, it may be more difficult or more expensive to oxidize one starting material as compared to another, and the yields may also be different. Also, the properties of the resultant phenolic resin-filler products may vary considerably, depending upon the particular oxidized carbonaceous filler employed; and one of the fillers might be best for uses where high-temperature resistance is important while another filler might be more suitable if high temperature resistance is unnecessary, etc.

The quantity of oxidized carbonaceous filler employed in making the resin-filler compositions of the present invention may also vary considerably depending upon several factors such as the intended use and requirements for the end product, the ease of incorporation of the particular filler used, etc. Preferably from 30 to 50 parts of filler by weight per 100 parts of phenolic resin are employed, with the range of 10 to 70 parts being typical, and the range of 5 to 200 parts per hundred parts of resin generally being the minimum and maximum amounts of filler which would be employed.

The composition and process claims are intended to cover the specified materials referred to in the claims as well as other materials such as described herein and which are typically employed in the phenolic resin art, and regardless of the order in which such materials are added to or employed in making the claimed compositions or in carrying out the claimed processes.

Having thus described the nautre of my invention, but being limited only by the appended claims with respect to the scope thereof.

I claim:

1. A plastic composition comprising essentially a phenolic resin containing as a filler finely divided oxidized carbonaceous particles, in an amount of from about 5 to about 200% by weight based on the weight of said phenolic resin, said finely divided oxidized carbonaceous particles being carbonaceous particles of petroleum origin which have an initial hydrocarbon volatile matter content exceeding 3% but which have been processed in an oxidizing gas such that their initial hydrocarbon volatile matter content has been reduced and their oxygen content has been increased to at least 5% by weight of the oxidized particles, and said finely divided oxidized carbonaceous particles having a bulk density exceeding 30 lbs. per cubic foot, a combined mineral and ash content of no higher than 2%, and a particle size substantially 100% of which is minus 10 mesh and at least 60% of which is minus 100 mesh.

2. A plastic composition according to claim 1 wherein said finely divided oxidized carbonaceous particles are present in an amount of from about 10 to about 70% by weight based on the weight of said phenolic resin.

3. A plastic composition comprising essentially a phenolic resin containing as a filler finely divided oxidized carbonaceous particles, in an amount of from about 5 to about 200% by weight based on the weight of said phenolic resin, said finely divided oxidized carbonaceous particles being carbonaceous particles of petroleum origin which have been processed in an oxidizing gas such that their initial hydrocarbon volatile matter content has been reduced and their oxygen content has been increased to at least 5% by weight of the oxidized particles, and said finely divided oxidized carbonaceous particles having a bulk density exceeding 30 lbs. per cubic foot, a combined mineral and ash content of no higher than 2%, a particle size substantially 100% of which is minus 10 mesh and at least 60% of which is minus 100 mesh, and said finely divided oxidized carbonaceous particles being produced by the oxidation of delayed coker raw petroleum coke having an initial hydrocarbon volatile matter content of from about 8 to about 17%.

4. A plastic composition according to claim 3 wherein the initial hydrocarbon content of the raw petroleum coke has been reduced about 20% and its oxygen content has been changed from less than 1% to at least 5% by weight of the oxidized product after the raw petroleum coke has been processed in the oxidizing gas.

5. A plastic composition comprising essentially a phenolic resin containing as a filler finely divided oxidized carbonaceous particles, in an amount of from about 5 to about 200% by weight based on the weight of said phenolic resin, said finely divided oxidized carbonaceous particles being carbonaceous particles of petroleum origin which have been processed in an oxidizing gas such that their initial hydrocarbon volatile matter content has been reduced and their oxygen content has been increased to at least 5% by weight of the oxidized particles, and said finely divided oxidized carbonaceous particles having a bulk density exceeding 30 lbs. per cubic foot, a combined mineral and ash content of no higher than 2%, a particle size substantially 100% of which is minus 10 mesh and at least 60% of which is minus 100 mesh, and said finely divided oxidized carbonaceous particles being produced by the oxidation of delayed coker partially calcined petroleum coke having an initial hydrocarbon volatile matter content exceeding about 3%.

6. A plastic composition according to claim 5 wherein the partially calcined petroleum coke particles have been derived by the partial calcination of raw petroleum coke to an extent that at least 30% of the initial hydrocarbon volatile matter content of the raw coke has been removed, and wherein the oxygen content of the partially calcined petroleum coke has been changed from less than 1% to at least 5% by weight of the oxidized product after the partially calcined petroleum coke has been processed in the oxidizing gas.

7. A plastic composition comprising essentially a phenolic resin containing as a filler finely divided oxidized carbonaceous particles, in an amount of from about 5 to about 200% by weight based on the weight of said phenolic resin, said finely divided oxidized carbonaceous particles being carbonaceous particles of petroleum origin which have been processed in an oxidizing gas such that their hydrocarbon volatile matter content has been reduced and their oxygen content has been increased to at least 5% by weight of the oxidized particles, and said finely divided oxidized carbonaceous particles having a bulk density exceeding 30 lbs. per cubic foot, a combined mineral and ash content of no higher than 2%, a particle size substantially 100% of which is minus 10 mesh and at least 60% of which is minus 100 mesh, and said finely divided oxidized carbonaceous particles being produced by the oxidation of fluid petroleum coke having a hydrocarbon volatile matter content of from about 3 to about 10%.

8. A plastic composition according to claim 7 wherein the oxygen content of the fluid petroleum coke has been changed from less than 1% to at least 5% by weight of the oxidized product after the fluid petroleum coke has been processed in the oxidizing gas.

9. A process for preparing a molded plastic article which comprises:
(A) mixing a phenolic resin with finely divided oxidized carbonaceous particles, in an amount of from about 5 to about 200% by weight based on the weight of said phenolic resin, said finely divided oxidized carbonaceous particles:
  (a) being carbonaceous particles of petroleum origin which have an initial hydrocarbon volatile matter content exceeding 3% but which have been processed in an oxidizing gas such that their hydrocarbon volatile matter content has been reduced and their oxygen content has been increased to at least 5% by weight of the oxidized particles;
  (b) having a bulk density exceeding 30 lbs. per cubic foot;
  (c) having a particle size substantially 100% of which is minus 10 mesh and at least 60% of which is minus 100 mesh; and
  (d) having a combined mineral and ash content of no higher than 2%;
(B) heat-working the resulting premix in a heated blending device to raise its temperature to between about 130° F. and 300° F.;
(C) stripping the material from the blending device;
(D) grinding the blended material;
(E) shaping this ground material into preforms;
(F) heating the preforms in a dielectric furnace to a desired molding temperature; and
(G) molding the heated preforms to the desired shape.

10. A process for preparing a molded plastic article which comprises:
(A) mixing a phenolic resin, an acid catalyst and hexamethylenetetramine, with finely divided oxidized carbonaceous particles, in an amount of from about 5 to about 200% by weight based on the weight of said phenolic resin, said finely divided oxidized carbonaceous particles:
  (a) being carbonaceous particles of petroleum origin which have an initial hydrocarbon volatile matter content exceeding 3% but which have been processed in an oxidizing gas such that their hydrocarbon volatile matter content has been reduced and their oxygen content has been increased to at least 5% by weight of the oxidized particles;
  (b) having a bulk density exceeding 30 lbs. per cubic foot;
  (c) having a particle size substantially 100% of which is minus 10 mesh and at least 60% of which is minus 100 mesh; and
  (d) having a combined mineral and ash content of no higher than 2%;
(B) heat-working the resulting premix in a heated blending device to raise its temperature to between about 130° F. and 300° F.;
(C) stripping the material from the blending device;
(D) grinding the blended material;
(E) shaping this ground material into preforms;
(F) heating the preforms in a dielectric furnace to a desired molding temperature; and
(G) molding the heated preforms to the desired shape.

11. A process for preparing a molded plastic article which comprises:
(A) mixing from about 5 to about 200 parts by weight of raw petroleum coke particles which have been processed in an oxidizing gas such that their hydrocarbon volatile matter content has been reduced at least about 20% from an original value between about 8 and about 17% and their oxygen content changed from less than 1% of the starting raw petroleum coke to at least 5% by weight of the oxidized product with 100 parts by weight of a phenolic resin;
(B) heat-working the resulting premix in a heated blending device to raise its temperature to between about 130° F. and 300° F.;
(C) stripping the material from the blending device;
(D) grinding the blended material;
(E) shaping this ground material into preforms;
(F) heating the preforms in a dielectric furnace to a desired molding temperature; and
(G) molding the heated preforms to the desired shape.

12. A process for preparing a molded plastic article which comprises:
(A) mixing from about 5 to about 200 parts by weight of raw petroleum coke particles which have been processed in an oxidizing gas such that their hydrocarbon volatile matter content has been reduced at least about 20% from an original value between about 8 and about 17% and their oxygen content changed from less than 1% of the starting raw petroleum coke to at least 5% by weight of the oxidized product with 100 parts by weight of a phenolic resin, an acid catalyst and hexamethylenetetramine;
(B) heat-working the resulting premix in a heated blending device to raise its temperature to between about 130° F. and 300° F.;
(C) stripping the material from the blending device;
(D) grinding the blended material;
(E) shaping this ground material into preforms;
(F) heating the preforms in a dielectric furnace to a desired molding temperature; and
(G) molding the heated preforms to the desired shape.

References Cited

UNITED STATES PATENTS

| | | | |
|---|---|---|---|
| 2,709,659 | 5/1955 | Werking | 260—38 |
| 3,046,240 | 7/1962 | Winter et al. | 260—38 |
| 3,264,210 | 8/1966 | Waghorn et al. | 23—209.1 |
| 3,264,240 | 8/1966 | Segura et al. | 260—41 |
| 3,279,935 | 10/1966 | Daniell et al. | 106—307 |

JULIUS FROME, *Primary Examiner.*

MORRIS LIEBMAN, *Examiner.*

R. S. BARON, *Assistant Examiner.*